(12) United States Patent
Lu et al.

(10) Patent No.: US 11,032,334 B2
(45) Date of Patent: Jun. 8, 2021

(54) ENHANCED CALL DOWNGRADE REASON INDICATOR

(71) Applicant: T-Mobile USA, Inc., Bellevue, WA (US)

(72) Inventors: Kun Lu, Bellevue, WA (US); Hsin-Fu Henry Chiang, Bellevue, WA (US); Satish K. Bhat, Sammamish, WA (US); Sireesha Panchagnula, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/296,207

(22) Filed: Mar. 7, 2019

(65) Prior Publication Data

US 2019/0207988 A1 Jul. 4, 2019

Related U.S. Application Data

(63) Continuation of application No. 15/827,379, filed on Nov. 30, 2017, now Pat. No. 10,305,943.

(51) Int. Cl.
*H04N 7/15* (2006.01)
*H04N 7/14* (2006.01)
(Continued)

(52) U.S. Cl.
CPC ...... *H04L 65/1089* (2013.01); *H04L 41/5025* (2013.01); *H04L 65/1006* (2013.01);
(Continued)

(58) Field of Classification Search
CPC ..... H04L 47/11; H04L 47/745; H04L 47/762; H04L 47/783; H04L 47/824;
(Continued)

(56) References Cited

U.S. PATENT DOCUMENTS

| 8,509,800 | B2 * | 8/2013 | Ong .................. H04L 47/11 455/452.1 |
| 9,445,051 | B1 * | 9/2016 | Muthsandra Kantharaju .............. H04L 65/80 |

(Continued)

FOREIGN PATENT DOCUMENTS

EP 2146529 1/2010

OTHER PUBLICATIONS

The PCT Search Report and Written Opinion dated Mar. 20, 2019 for PCT Application No. PCT/US18/61095, 10 pages.
(Continued)

*Primary Examiner* — Binh Kien Tieu
(74) *Attorney, Agent, or Firm* — Lee & Hayes, P.C.

(57) ABSTRACT

A method of signaling a reason for a downgrade of an enhanced call to an audio-only call. User equipment (UE) can engage, via a telecommunication network, in an enhanced call including audio content and additional content. The UE can generate a downgrade message that requests a downgrade of the enhanced call to an audio-only call that includes the audio content without the additional content. The downgrade message can include a downgrade reason indicator identifying whether the UE is automatically downgrading the enhanced call or whether the UE is instead downgrading the enhanced call due to user instructions. The UE can send the downgrade message to the telecommunication network.

20 Claims, 6 Drawing Sheets

(51) Int. Cl.
  *H04L 29/06* (2006.01)
  *H04L 12/24* (2006.01)
  *H04M 3/36* (2006.01)
  *H04W 72/04* (2009.01)

(52) U.S. Cl.
  CPC ...... *H04L 65/1016* (2013.01); *H04L 65/1059* (2013.01); *H04L 65/1069* (2013.01); *H04L 65/4053* (2013.01); *H04L 65/4069* (2013.01); *H04L 65/607* (2013.01); *H04L 65/80* (2013.01); *H04M 3/367* (2013.01); *H04N 7/147* (2013.01); *H04N 7/15* (2013.01); *H04N 2007/145* (2013.01); *H04W 72/0413* (2013.01)

(58) Field of Classification Search
  CPC . H04L 65/1016; H04L 65/1069; H04L 65/80; H04L 65/4053; H04L 65/4069; H04L 41/5025; H04N 7/15; H04N 7/147
  USPC ........... 455/452.1, 452.2; 370/230, 232, 236, 370/242, 248, 252; 348/14.01, 14.02, 348/14.03
  See application file for complete search history.

(56) References Cited

U.S. PATENT DOCUMENTS

| | | | |
|---|---|---|---|
| 9,826,380 | B1 | 11/2017 | Zait |
| 2004/0180689 | A1* | 9/2004 | Nayak ..................... H04W 8/18 455/552.1 |
| 2005/0180338 | A1 | 8/2005 | Pirila et al. |
| 2006/0293073 | A1* | 12/2006 | Rengaraju ............... H04N 7/152 455/518 |
| 2007/0239885 | A1* | 10/2007 | Vadlakonda ............ H04M 3/56 709/232 |
| 2008/0205267 | A1* | 8/2008 | El Barachi .......... H04L 65/1069 370/230 |
| 2010/0309847 | A1* | 12/2010 | Bharadwaj ............. H04W 48/18 370/328 |
| 2014/0022904 | A1* | 1/2014 | Ahmad ............. H04W 28/0215 370/235 |
| 2014/0253664 | A1 | 9/2014 | An et al. |
| 2015/0049157 | A1 | 2/2015 | Krishnamoorthy et al. |
| 2015/0142579 | A1 | 5/2015 | Xiong |
| 2016/0337908 | A1* | 11/2016 | Poikselka ............. H04W 76/50 |
| 2017/0171286 | A1 | 6/2017 | Coste et al. |
| 2019/0014613 | A1* | 1/2019 | Antsev .................. H04W 76/18 |
| 2020/0204599 | A1* | 6/2020 | Ravichandran ..... H04L 65/1006 |
| 2020/0413368 | A1* | 12/2020 | Achamola ............. H04M 19/04 |

OTHER PUBLICATIONS

Office Action for U.S. Appl. No. 15/827,379, dated Nov. 5, 2018, Lu et al, "Enhanced Call Downgrade Reason Indicator", 11 pages.
Office action for U.S. Appl. No. 15/827,379, dated Jul. 18, 2018, Lu, "Enhanced Call Downgrade Reason Indicator", 8 pages.

* cited by examiner

| Default Bearer 314 | SIP Messaging | QCI = 5 |
| Dedicated Bearer 314 | Audio Content 202 | QCI = 1 |
| Dedicated Bearer 314 | Additional Content 204 | QCI = 2 |

ENHANCED CALL DOWNGRADE REASON INDICATOR

RELATED APPLICATIONS

This application is a continuation of and claims priority to U.S. patent application Ser. No. 15/827,379, filed on Nov. 30, 2017, entitled "ENHANCED CALL DOWNGRADE REASON INDICATOR" which is incorporated by reference herein in its entirety.

BACKGROUND

Telephone calls have been traditionally been voice calls in which audio content is sent from telephone to telephone. However, telecommunication networks have advanced to allow enhanced calls that include other types of content in addition to audio content. For example, video calls that include both an audio component and a video component can be transmitted over a Long-Term Evolution (LTE) network using Video over LTE (ViLTE) technology. As another example, a real-time text (RTT) call can include the audio content of a voice call along with text characters that are transmitted in real time as a user types them.

In some situations, a user equipment (UE) device can downgrade an enhanced call to an audio-only call, either automatically or based on a user's instruction. For example, a UE can automatically downgrade a video call to an audio-only call if there is a problem with the UE or a telecommunication network, such as if there is insufficient bandwidth available to transmit the video component of the video call. As another example, a UE can downgrade a video call to an audio-only call when a user chooses to deactivate a camera at the UE during the video call.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Telecommunication networks can carry enhanced calls between user equipment (UE) devices. An enhanced call can be a Video over LTE (ViLTE) video call or other type of video call, a real-time text (RTT) call, or any other type of call that includes audio content and at least one other type of content. However, during an enhanced call, in some situations a UE can downgrade the enhanced call to an audio-only call. A UE can downgrade an enhanced call to an audio-only call either automatically or based on a user's instruction.

A UE can automatically downgrade an enhanced call upon the occurrence of one or more events or conditions that would impact the UE's ability to provide at least a threshold quality of service for both the audio content and the additional type of content of the enhanced call. Such events or conditions can include the UE's available bandwidth falling below a threshold level, a battery power level falling below a threshold level, signal quality falling below a threshold level, a number of lost data packets exceeding a threshold level, and/or any other event or condition. By way of a non-limiting example, a UE can be set to automatically downgrade a ViLTE video call to an audio-only call when the available bandwidth drops below 192 kilobits per second (kbps).

A UE can also downgrade an enhanced call when instructed to do so either implicitly or explicitly by a user. For example, during a video call a user can select an option through a user interface at a UE to disable the UE's camera, thereby implicitly instructing the UE to downgrade the video call to an audio-only call. Alternately, a user can select an explicit option to downgrade a video call to an audio-only call. As another example, during an RTT call a user can select an option through a user interface at a UE to remove the display of a keyboard and/or RTT text from the UE's screen, thereby implicitly instructing the UE to downgrade the RTT call to an audio-only call. Alternately, a user can select an explicit option to downgrade an RTT call to an audio-only call.

Upon the occurrence of one or more automatic downgrade conditions, or upon a user's selection of an option that leads to a downgrade of an enhanced call, the UE can inform the telecommunication network that the enhanced call is being downgraded to an audio-only call. However, in previous systems, although a UE could inform a telecommunication network when it was downgrading an enhanced call to an audio-only call, the UE did not inform the telecommunication network why the downgrade occurred. Accordingly, in previous systems it could not be determined from the network side whether a downgrade of an enhanced call occurred due to a user's instruction, or because there was a problem either with the telecommunication network's service or with the UE itself. This made it difficult to identify and/or fix such network problems and/or UE problems.

Example Environment

Figure 1:
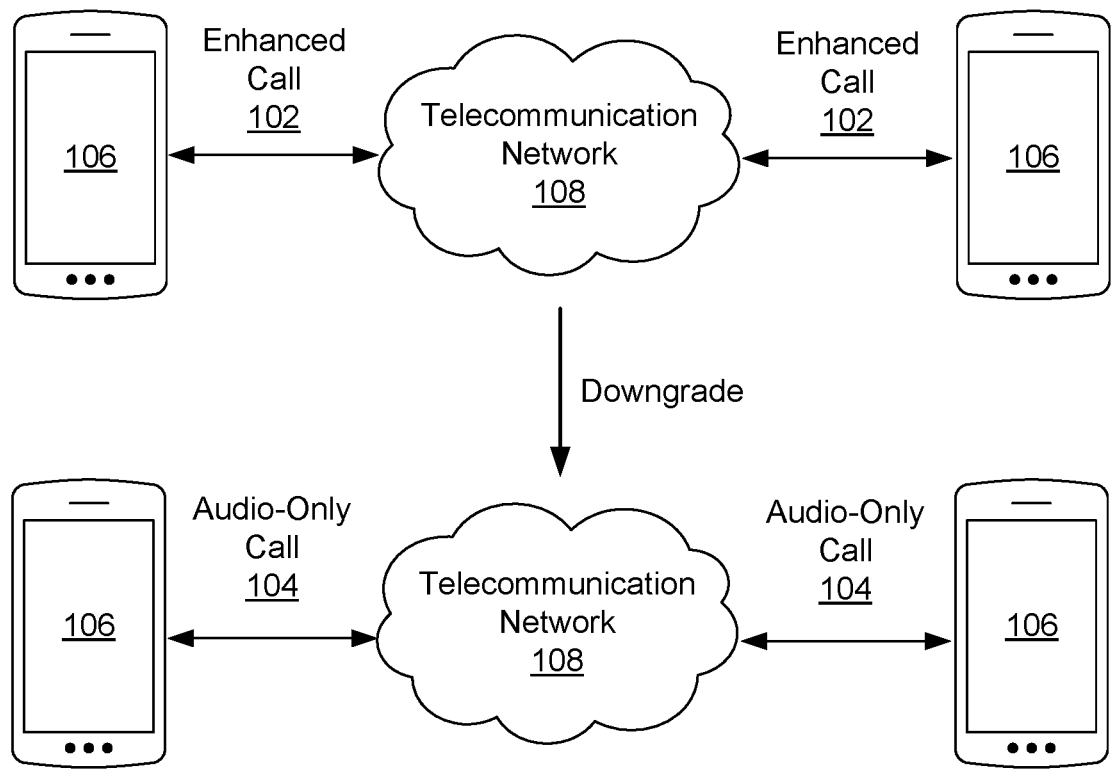
FIG. 1 depicts a downgrade from an enhanced call to an audio-only call.

FIG. 1 depicts a downgrade from an enhanced call 102 to an audio-only call 104. Two UEs 106 can engage in an enhanced call 102 over a telecommunication network 108. During an enhanced call 102, either of the UEs 106 can instruct the telecommunication network 108 to downgrade the enhanced call 102 to an audio-only call 104.

A UE 106 can be any device that wirelessly connects to the telecommunication network 108, such as a smart phone, a cellular phone, a personal digital assistant (PDA), a personal computer (PC), a laptop, a desktop, a workstation, a media player, a tablet, a gaming device, a smart watch, or any other type of computing or communication device. An example UE 106 is illustrated in greater detail in FIG. 6 and is described in detail below with reference to that figure.

The telecommunication network 108 can include networks of one or more providers or operators. A UE 106 can connect to a base station of the telecommunication network 108 through a wireless access technology, such as Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, and/or WiFi® technology. For example, in an LTE network a base station can be an eNode B (eNB).

Figure 2:
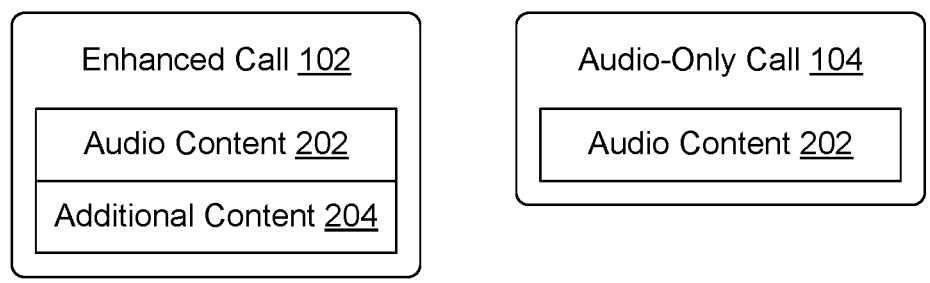
FIG. 2 depicts content types in an enhanced call and an audio-only call.

FIG. 2 depicts content types in an enhanced call 102 and an audio-only call 104. While an audio-only call 104 can include audio content 202, an enhanced call 102 can include audio content 202 plus one or more types of additional content 204. An enhanced call 102 or an audio-only call 104 can also be associated with metadata or other data that describes attributes of the call, such as identifiers of the originating and/or terminating UE 106, or information allowing the call to be connected and/or routed through the telecommunication network 108.

In some examples, an enhanced call 102 can be a video call in which the audio content 202 is an audio component of the video call and the additional content 204 is a video component of the video call. By way of a non-limiting example, when the telecommunication network 108 is an LTE network, the video call can be a Video over LTE (ViLTE) call transmitted in part using an IP Multimedia Subsystem (IMS). In this example, a ViLTE call can be downgraded to an audio-only call 104 for an LTE network, such as a Voice over LTE (VoLTE) call.

In other examples, an enhanced call 102 can be a real-time text (RTT) call in which the audio content 202 is voice or other audio data, and the additional content 204 is text that is transmitted in real time as the characters are typed by users of the UEs 106. For example, a UE 106 can display a keyboard on screen through which users can type messages, as well as display the text of previously sent and/or received characters and messages. As such, in an RTT call, users can hold a voice conversation while simultaneously exchanging text messages. When the RTT call is downgraded to a VoLTE call or other type of audio-only call, the keyboard and/or RTT text display can be removed from the UE's screen while still allowing the users to continue their voice conversation.

In still other examples, the additional content 204 of an enhanced call 102 can be any other type of data, such as non-real-time text, a text transcript of the audio content 202 generated through speech recognition, pictures, map data, advertising content, file transfers, prerecorded video, and/or any other type of additional content 204.

Example Architecture

Figures 3, 4:
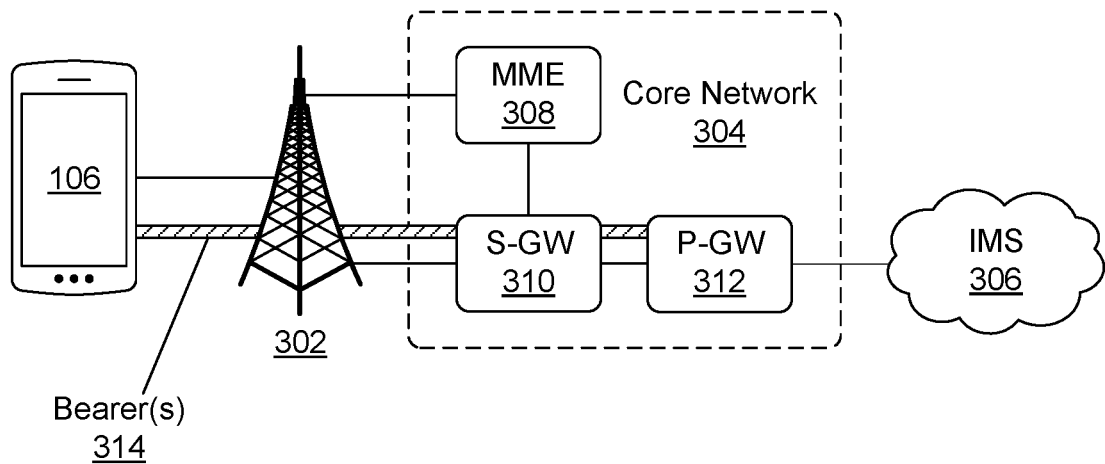
FIG. 3 depicts an example of a system architecture for a telecommunication network.
FIG. 4 depicts an example of default and dedicated bearers.

FIG. 3 depicts an example of a system architecture for a telecommunication network 108. The telecommunication network 108 can comprise one or more base stations 302, a core network 304, and an IP Multimedia Subsystem (IMS) 306. In an LTE network, a base station 302 can be an eNode B (eNB), and the core network 304 can be an evolved packet core (EPC).

A UE 106 can connect to a base station 302 to access the core network 304 through the base station 302, and to access the IMS 306 through the base station 302 and the core network 304. The core network 304 can have components including a Mobility Management Entity (MME) 308, one or more Serving Gateways (S-GWs) 310, and one or more Packet Data Network (PDN) Gateways (P-GWs) 312. The MME 308 can be a control node in the core network 304 that can set up and manage default and dedicated bearers 314, authenticate subscribers in conjunction with a Home Subscriber Server (HSS), choose an S-GW 310 for a UE 106, and/or perform other functions of the core network 304. In some examples, the MME 308 can communicate with the UE 106 using Non-Access Stratum (NAS) messages. An S-GW 310 can be connected to a P-GW 312, which connects the core network 304 to the IMS 306, the Internet, and/or other networks and servers.

The IMS 306 can include Call Session Control Function (CSCF) elements, including a Proxy CSCF (P-CSCF) and a Serving CSCF (S-CSCF). The Call Session Control Function elements can process and send Session Initiation Protocol (SIP) messages to control multimedia communications sessions that are carried out through the core network 304, including sessions for audio-only calls 104, such as VoLTE calls, and enhanced calls 102, such as ViLTE video calls or RTT calls. The IMS 306, and/or a Policy and Charging Rules Function (PCRF) node in communication with both the IMS 306 and core network 304, can instruct the MME 308 and/or other elements of the core network 304 how to prepare and manage the core network 304 for a communication session. Accordingly, the core network 304 and IMS 306 can work together to establish audio-only calls 104 or enhanced calls 102, and/or to downgrade an enhanced call 102 to an audio-only call 104.

FIG. 4 depicts an example of default and dedicated bearers 314. Bearers 314 can be established and managed in the core network 304 by the MME 308 and/or other components of the core network 304. A default bearer 314 can be established for a call session to transmit SIP messages or other signaling related to the establishment and/or management of the call session. One or more dedicated bearers 314 can also be established for a call session in addition to the default bearer 314, and the dedicated bearers 314 can be used to transmit specific types of content for the call session, such as audio content 202 and/or additional content 204.

A bearer 314 can define a Quality of Service (QoS) that should be provided to traffic associated with that bearer 314 by base stations 302 and/or elements of the core network 304. For example, traffic associated with a bearer 314 that has a QoS with a guaranteed minimum bitrate can, if necessary, be prioritized by network elements over traffic associated with another bearer 314 that has a QoS without a guaranteed minimum bitrate.

A QoS associated with a bearer 314 can be indicated by a QoS Class Identifier (QCI). In some examples, a bearer 314 with a QCI value from 1 to 4 can indicate that traffic in that bearer 314 should be transmitted at least at a minimum guaranteed bitrate, while a bearer 314 with a QCI value from 5 to 9 can indicate that traffic in that bearer 314 will be transmitted using best effort service without a guaranteed bitrate. For example, in some schemes a default bearer 314 can have a QCI value of 5, indicating that traffic in the default bearer 314 has a high priority but a non-guaranteed bitrate, while a dedicated bearer 314 for audio content 202 can have a QCI value of 1 and a dedicated bearer for video content or other additional content 204 can have a QCI value of 2, indicating that traffic in the dedicated bearers 314 has been given a guaranteed bitrate.

In some examples, the IMS 306 can instruct the core network 304 to establish and/or terminate bearers 314 based on SIP messages from a UE 106 to the IMS 306. For example, a P-CSCF in the IMS 306 can identify the type of call being requested by a UE 106 in a SIP message so that the IMS 306 or a PCRF can instruct the MME 308 in the core network to establish and/or terminate bearers 314 accordingly. In other examples, bearers 314 can be established and/or terminated based on Non-Access Stratum (NAS) messages between a UE 106 and an MME 308.

FIG. 3 depicts one UE 106 in communication with one core network 304 and one IMS 306, such that the core network 304 can establish bearers 314 for that UE 106 to engage in an enhanced call 102 or audio-only call 104. Corresponding bearers 314 can also be established in the same core network 304 or a different core network 304 for one or more other UEs 106 engaged in the enhanced call 102 or audio-only call 104. For example, when an originating UE 106 is connected to a first core network 304 and a terminating UE 106 is connected to a second core network 304, the IMS 306 connected to the first core network 304 can be in communication with a second IMS 306 connected to the second core network 304, such that it can instruct the second core network 304 to establish and/or terminate bearers 314 for the terminating UE 106 based on call setup and/or call downgrade SIP messages from the originating UE 106.

Figure 5:
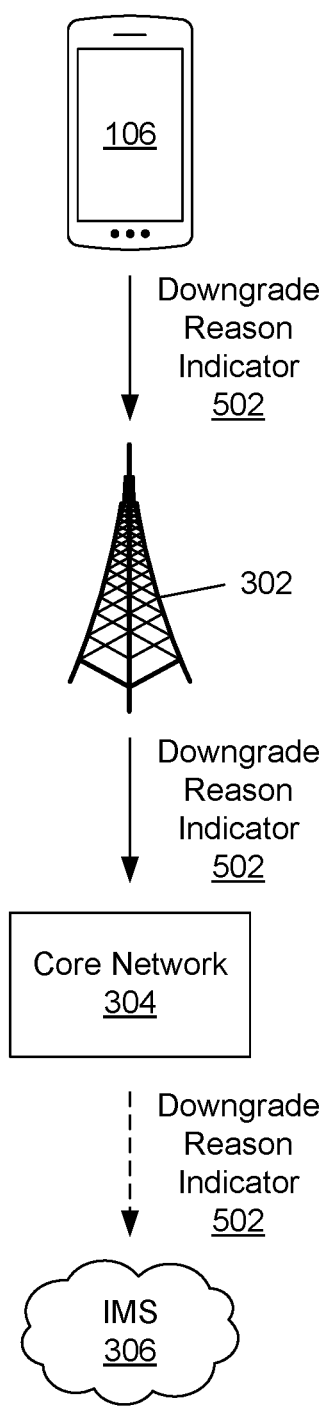
FIG. 5 depicts a user equipment (UE) device transmitting a downgrade reason indicator to a core network and/or an IP Multimedia Subsystem (IMS).

FIG. 5 depicts a UE 106 transmitting a downgrade reason indicator 502 through the base station 302 to the core network 304 and/or the IMS 306. When a UE 106 downgrades an enhanced call 102 to an audio-only call 104, either automatically or due to a user's instruction, the UE 106 can transmit a downgrade reason indicator 502 to the core network 304 and/or IMS 306. The downgrade reason indicator 502 can identify why the UE 106 is downgrading an enhanced call 102 to an audio-only call 104, such as that it is automatically downgrading the enhanced call 102 or that a user initiated the downgrade of the enhanced call 102.

The downgrade reason indicator 502 can an encoded bit, flag, code, text description, and/or any other type of indicator or value included in control layer information sent from the UE 106 to the core network 304 and/or IMS 306. For example, the downgrade reason indicator 502 can an encoded bit or flag in a NAS message, or a code and/or text description in a header of a SIP message.

In some examples a downgrade reason indicator 502 can be included in a message sent by a UE 106 to inform the core network 304 and/or the IMS 306 that the UE 106 is downgrading an enhanced call 102 to an audio-only call 104. For example, a downgrade reason indicator 502 can be included in a SIP message, NAS message, or other type of message that requests the downgrade and/or indicates that one or more dedicated bearers 314 should be modified or terminated. In other examples, a downgrade reason indicator 502 can be sent by a UE 106 to the core network 304 and/or the IMS 306 separately from instructions for modifying or terminating one or more bearers 314.

Figure 6:
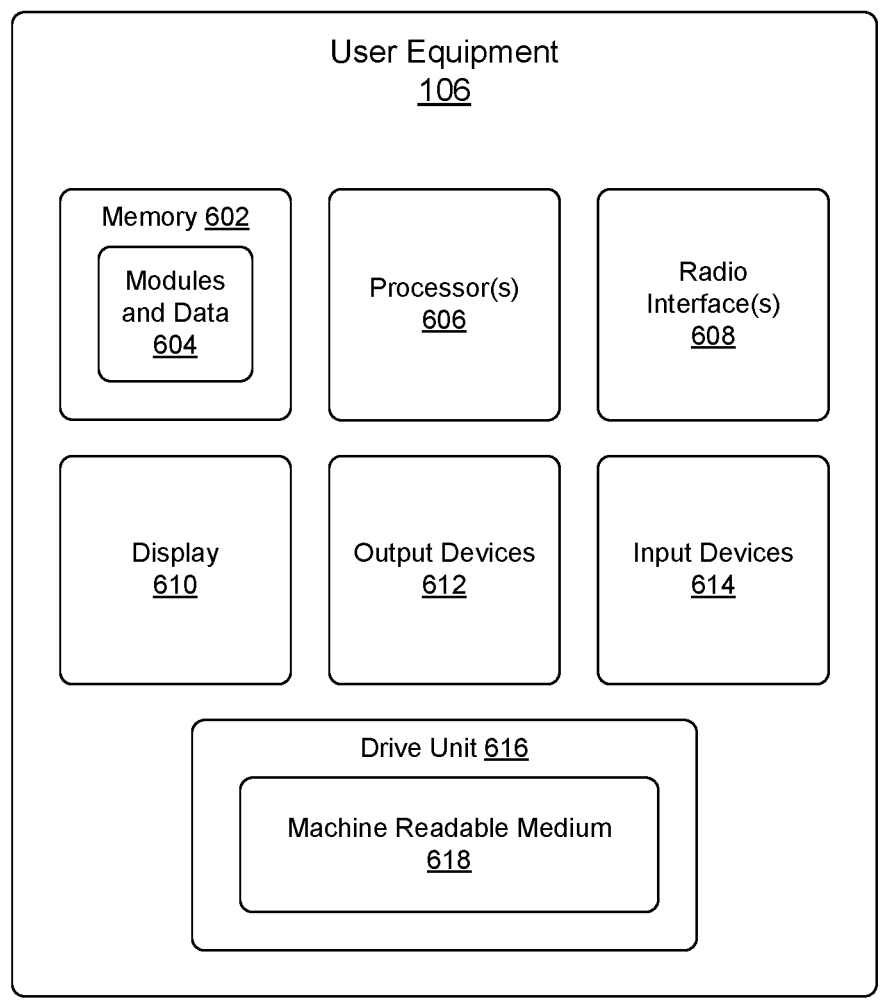
FIG. 6 depicts an example system architecture for a UE.

FIG. 6 depicts an example system architecture for a UE 106, in accordance with various examples. As shown, a UE 106 can include a memory 602 that stores modules and data 604, processor(s) 606, radio interfaces 608, a display 610, output devices 612, input devices 614, and/or a drive unit 616 including a machine readable medium 618.

In various examples, memory 602 can include system memory, which may be volatile (such as RAM), non-volatile (such as ROM, flash memory, etc.) or some combination of the two. Memory 602 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the UE 106. Any such non-transitory computer-readable media may be part of the UE 106.

In some examples memory 602 can also include a SIM (subscriber identity module) card, which is a removable memory card used to identify a user of the UE 106 to a telecommunication network 108.

The modules and data 604 can be utilized by the UE 106 to perform or enable performing any action taken by the UE 106. The modules and data 604 can include a UE platform and applications, and data utilized by the platform and applications.

In various examples, the processor(s) 606 can be a central processing unit (CPU), a graphics processing unit (GPU), or both CPU and GPU, or any other type of processing unit. Each of the one or more processor(s) 606 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 606 may also be responsible for executing all computer applications stored in the memory 602, which can be associated with common types of volatile (RAM) and/or nonvolatile (ROM) memory.

The radio interfaces 608 can include transceivers, modems, interfaces, antennas, and/or other components that perform or assist in exchanging radio frequency (RF) communications with a base station 302. In other examples a processor 606, other modules and data 604, and/or other components of the UE 106 can perform or assist in transmitting and/or receiving data, and/or pre-processing or post-processing of such data.

The display 610 can be a liquid crystal display or any other type of display commonly used in UEs 106. For example, display 610 may be a touch-sensitive display screen, and can then also act as an input device or keypad, such as for providing a soft-key keyboard, navigation buttons, or any other type of input.

The output devices 612 can include any sort of output devices known in the art, such as a display 610, speakers, a vibrating mechanism, and/or a tactile feedback mechanism. Output devices 612 can also include ports for one or more peripheral devices, such as headphones, peripheral speakers, and/or a peripheral display.

The input devices 614 can include any sort of input devices known in the art. For example, input devices 614 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 618 can store one or more sets of instructions, such as software or firmware, that embodies any one or more of the methodologies or functions described herein. The instructions can also reside, completely or at least partially, within the memory 602, processor(s) 606, and/or radio interface(s) 608 during execution thereof by the UE 106. The memory 602 and the processor(s) 606 also can constitute machine readable media 622.

Example Operations

Figure 7:
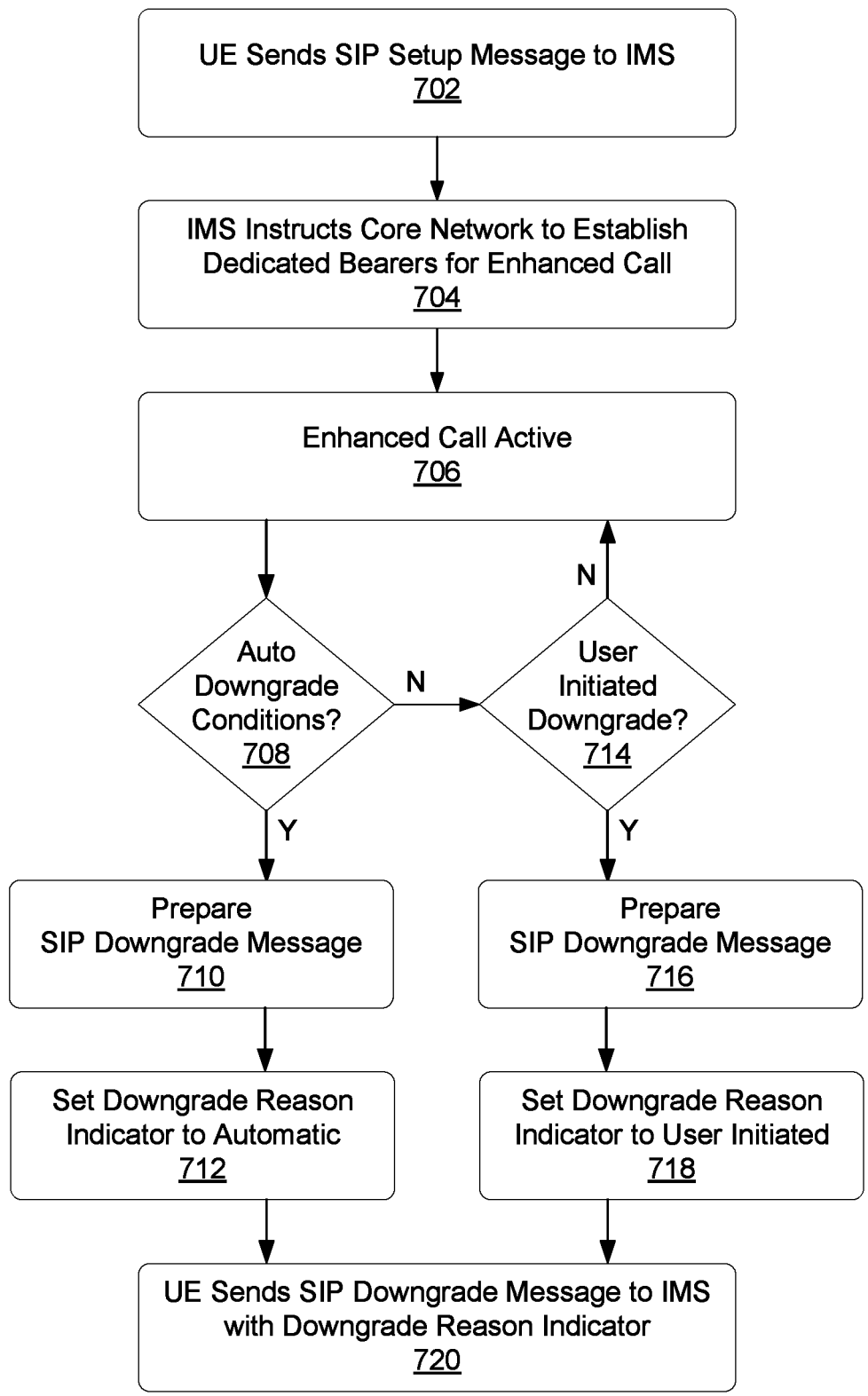
FIG. 7 depicts a flow chart of an exemplary process for sending a downgrade reason indicator via Session Initiation Protocol (SIP) messaging.

FIG. 7 depicts a flow chart of an exemplary process for sending a downgrade reason indicator 502 via SIP messaging when downgrading an enhanced call 102 to an audio-only call 104.

At block 702, a UE 106 can begin an enhanced call 102 with another UE 106 by sending a SIP setup message to the IMS 306 through a default bearer 314. For example, the SIP setup message can be a SIP INVITE message. As discussed above, a default bearer 314 can be set up in the core network 304 to transmit SIP messages or other signaling related to the establishment and/or management of a call session, such as the SIP setup message.

The SIP setup message can identify the type of the enhanced call 102, such as whether it is a video call or an RTT call. In some examples the SIP setup message can indicate each type of content in the enhanced call 102, including the audio content 202 and one or more types of additional content 204, and/or a requested QoS level for each of the types of content.

At block 704, the IMS 306 can instruct the core network 304 to establish one or more dedicated bearers 314 for the enhanced call 102 in response to the SIP setup message. A component of the IMS 306, such as the P-CSCF in the IMS 306 can review SIP setup message to determine the types of content in the enhanced call 102, and/or a QoS level for each of the types of content. Accordingly, a PCRF can instruct the core network 304 to establish dedicated barriers 314 for the type of enhanced call 102 requested by the UE 106.

For example, when the enhanced call 102 is a video call, the IMS 306 can instruct the core network 304 to set up two dedicated bearers 314, one for the audio component and one for the video component, in addition to the default bearer 314. As another example, when the enhanced call 102 is an RTT call, the IMS 306 can instruct the core network 304 to set up a single dedicated bearer 314 for both the audio content 202 and the text content, because text may not be expected to use many bits compared to the audio content 202. Alternately, separate dedicated bearers 314 can be established for the audio content 202 and text content of an RTT call.

Once dedicated bearers 314 have been established, the IMS 306 can finish setting up the enhanced call 102 between the UEs 106 and the enhanced call 102 can be active at block 706. While the enhanced call 102 is active during block 706, data packets for the audio content 202 and additional content 204 can be passed through the associated dedicated bearers 314 within the core network 304. As will be discussed below, in some situations block 706 can be skipped when automatic downgrade conditions occur or user downgrade instructions are received after the SIP setup message is sent at block 702 but before the enhanced call 102 becomes active.

At block 708, the UE 106 can determine if any automatic downgrade conditions have been satisfied. A UE 106 can be configured with automatic downgrade conditions that, if satisfied, may indicate that the UE 106 cannot provide at least a threshold QoS for both the audio content 202 and the additional content 204. For example, an automatic downgrade condition can be when a minimum guaranteed bitrate defined by a QCI value for a dedicated bearer 314 for the audio content 202 and/or additional content 204 cannot be met by the UE 106 and/or the telecommunication network 108. Other automatic downgrade conditions can be when the UE's available bandwidth falls below a threshold level, the UE's battery power level falls below a threshold level, the quality of network signals received by the UE 106 falls below a threshold level, data packets sent to or from the UE 106 become lost or need retransmission at more than a threshold level, or any other condition.

If the UE 106 determines at block 708 that one or more automatic downgrade conditions have been satisfied, at block 710 the UE 106 can prepare a SIP downgrade message that indicates to the IMS 306 that the call session is being modified or updated to downgrade the enhanced call 102 to an audio-only call 104. For example, the SIP downgrade message can be a SIP re-INVITE message that indicates to the IMS 306 that an existing enhanced call 102 is being downgraded to an audio-only call 104. In alternate situations in which one or more automatic downgrade conditions are satisfied after an initial SIP setup message was sent at block 702 but before the enhanced call 102 became active at block 706, the SIP downgrade message can be a SIP UPDATE message.

At block 712, the UE 106 can add or set a downgrade reason indicator 502 in a header and/or body of the SIP downgrade message. For example, the UE 106 can add a code and/or text description to a downgrade reason header in a SIP re-INVITE message or SIP UPDATE message. The code and/or text description can indicate to the IMS 306 that the UE 106 is automatically downgrading the enhanced call 102.

If one or more automatic downgrade conditions were not satisfied at block 708, the UE 106 can move to block 714 to determine if the UE 106 has received any explicit or implicit instructions from a user to downgrade the enhanced call 102 to an audio-only call 104. If no explicit or implicit downgrade instructions have been received at block 714, the UE 106 can return to block 706 and continue to check for the occurrence of automatic downgrade conditions at block 708 and/or user downgrade instructions at block 714 until either the enhanced call 102 is downgraded or the enhanced call 102 ends. In alternate examples, blocks 708 and 714 can be reversed, the UE 106 can check for automatic downgrade conditions and/or user downgrade instructions at preset times or intervals, or the UE 106 can check for automatic downgrade conditions and/or user downgrade instructions using any other method.

If the UE 106 determines at block 714 that a user selected a downgrade of the enhanced call 102 through explicit or implicit instructions to the UE 106, at block 716 the UE 106 can prepare a SIP downgrade message that indicates to the IMS 306 that the call session is being modified or updated to downgrade the enhanced call 102 to an audio-only call 104. As described above, the SIP downgrade message can be a SIP re-INVITE message indicating that an existing enhanced call 102 is being downgraded to an audio-only call 104, or a SIP UPDATE message indicating a change from an enhanced call 102 to an audio-only call 104 if the enhanced call 102 has not yet become active.

At block 718, the UE 106 can add or set a downgrade reason indicator 502 in a header and/or body of the SIP downgrade message. For example, the UE 106 can add a code and/or text description to a downgrade reason header in a SIP re-INVITE message or SIP UPDATE message. The code and/or text description can indicate to the IMS 306 that a user initiated the downgrade from the enhanced call 102 to the audio-only call 104.

After a SIP downgrade message has been prepared with a downgrade reason indicator 502 in either blocks 710 and 712 or blocks 716 and 718, the UE 106 can send the SIP downgrade message to the IMS 306 at block 720. The IMS 306 can determine from the SIP downgrade message that the enhanced call 102 is being downgraded to an audio-only call, and in response instruct the core network 304 to terminate and/or modify one or more of the dedicated bearers 314. For example, when the SIP downgrade message is a SIP re-INVITE message indicating that a video call is being downgraded to an audio-only call, the IMS 306 can instruct the core network 304 to terminate a dedicated bearer 314 for the video content while maintaining a separate dedicated bearer 314 for the audio content 202.

The IMS 306 can also determine from the downgrade reason indicator 502 in the SIP downgrade message that the downgrade of the enhanced call 102 was initiated either automatically by the UE 106 or by a user's instruction. The IMS 306 can store that information in a database, and/or inform the core network 304 that the enhanced call 102 was downgraded automatically or due to a user's instruction.

Figure 8:
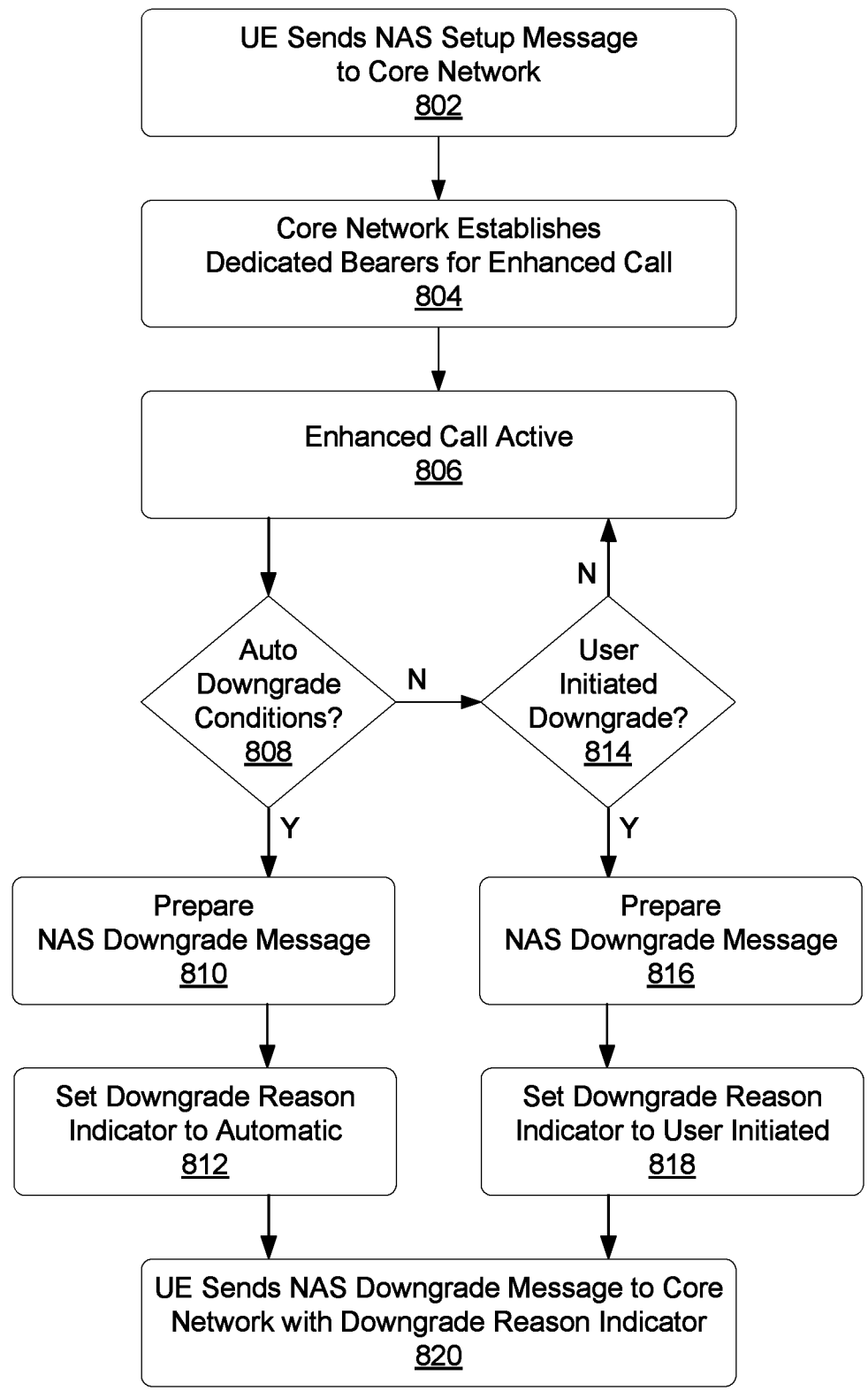
FIG. 8 depicts a flow chart of an exemplary process for sending a downgrade reason indicator via Non-Access Stratum (NAS) messaging.

FIG. 8 depicts a flow chart of an exemplary process for sending a downgrade reason indicator 502 via NAS messaging when downgrading an enhanced call 102 to an audio-only call 104.

At block 802, a UE 106 can begin an enhanced call 102 with another UE 106 in part by sending one or more NAS setup messages to the MME 308 or other component of the core network 304. For example, a NAS setup message can be a PDN CONNECTIVITY REQUEST that requests a default bearer 314 for a PDN connection to the IMS 306 or other PDN, or a BEARER RESOURCE ALLOCATION REQUEST message that requests that the core network 304 establish one or more dedicated bearers 314 for the enhanced call 102. In some examples a NAS setup message can identify QoS levels or QCI values for the requested dedicated bearers 314.

At block 804, the core network 304 can establish a default bearer 314 and one or more dedicated bearers 314 for the enhanced call 102 in response to the NAS setup messages. For example, when the enhanced call 102 is a video call, the core network 304 can establish two dedicated bearers 314, one for the audio component and one for the video component. As another example, when the enhanced call 102 is an RTT call, the core network 304 can establish a single dedicated bearer 314 for both the audio content 202 and the text content of the RTT call, or establish separate dedicated bearers 314 for the audio content 202 and text content.

After the dedicated bearers 314 have been established, the enhanced call 102 can be active at block 806. While the enhanced call 102 is active during block 806, data packets for the audio content 202 and additional content 204 can be passed through the associated dedicated bearers 314 within the core network 304.

At block 808, the UE 106 can determine if any automatic downgrade conditions have been satisfied. A UE 106 can be configured with automatic downgrade conditions that, if satisfied, may indicate that the UE 106 cannot provide at least a threshold QoS for both the audio content 202 and the additional content 204. For example, an automatic downgrade condition can be when a minimum guaranteed bitrate defined by a QCI value for a dedicated bearer 314 for the audio content 202 and/or additional content 204 cannot be met by the UE 106 and/or the telecommunication network 108. Other automatic downgrade conditions can be when the UE's available bandwidth falls below a threshold level, the UE's battery power level falls below a threshold level, the quality of network signals received by the UE 106 falls below a threshold level, data packets sent to or from the UE 106 become lost or need retransmission at more than a threshold level, or any other condition.

If the UE 106 determines at block 808 that one or more automatic downgrade conditions have been satisfied, at block 810 the UE 106 can prepare a NAS downgrade message that indicates to the core network 304 that one or more dedicated bearers 314 should be terminated and/or modified in order to downgrade the enhanced call 102 to an audio-only call 104. For example, the NAS downgrade message can be a PDN DISCONNECT REQUEST message to end a PDN connection for the enhanced call 102 in order to set up a separate PDN connection for the downgraded audio-only call 104, or a BEARER RESOURCE MODIFICATION REQUEST message that indicates a dedicated bearer 314 should be terminated or modified. For example, a NAS downgrade message can indicate that a dedicated bearer 314 for video content of a video call should be terminated while leaving a dedicated bearer 314 the audio content 202 in place, such that transmission of the audio content can be continued when the video call is downgraded to an audio-only call 104. As another example, a NAS downgrade message can indicate that a dedicated bearer 314 for an RTT call that was used to transmit both audio content 202 and text content should be modified to carry just the audio content 202 when the RTT call is downgraded to an audio-only call 104.

At block 812, the UE 106 can add or set a downgrade reason indicator 502 in the NAS downgrade message. In some examples, the UE 106 can set a particular bit in the NAS downgrade message to "1" to indicate that the UE 106 is automatically downgrading the enhanced call 102. In other examples, a flag, code, or other value can be similarly set in the NAS downgrade message to indicate that the UE 106 is automatically downgrading the enhanced call 102.

If one or more automatic downgrade conditions were not satisfied at block 808, the UE 106 can move to block 814 to determine if the UE 106 has received any explicit or implicit instructions from a user to downgrade the enhanced call 102 to an audio-only call 104. If no explicit or implicit downgrade instructions have been received at block 814, the UE 106 can return to block 806 and continue to check for the occurrence of automatic downgrade conditions at block 808 and/or user downgrade instructions at block 14 until either the enhanced call 102 is downgraded or the enhanced call 102 ends. In alternate examples, blocks 808 and 814 can be reversed, the UE 106 can check for automatic downgrade conditions and/or user downgrade instructions at preset times or intervals, or the UE 106 can check for automatic downgrade conditions and/or user downgrade instructions using any other method.

If the UE 106 determines at block 814 that a user selected a downgrade of the enhanced call 102 through explicit or implicit instructions to the UE 106, at block 816 the UE 106 can prepare a NAS downgrade message that indicates to the core network 304 that one or more dedicated bearers 314 should be terminated and/or modified in order to downgrade the enhanced call 102 to an audio-only call 104. As described above, the NAS downgrade message can be a NAS message, such as a PDN DISCONNECT REQUEST message, a BEARER RESOURCE MODIFICATION REQUEST message, or any other type of NAS message.

At block 818, the UE 106 can add or set a downgrade reason indicator 502 in the NAS downgrade message. In some examples, the UE 106 can set a particular bit in the NAS downgrade message to "0" to indicate that a user initiated the downgrade from the enhanced call 102 to the audio-only call 104. In other examples, a flag, code, header, or other value can be similarly set in the NAS downgrade message to indicate that a user initiated the downgrade from the enhanced call 102 to the audio-only call 104.

After a NAS downgrade message has been prepared with a downgrade reason indicator 502 in either blocks 810 and 812 or blocks 816 and 818, the UE 106 can send the NAS downgrade message to the MME 308 or other element of the core network 304 at block 820. In response, the core network 304 can terminate and/or modify one or more of the dedicated bearers 314. For example, when the NAS downgrade message requests that a dedicated bearer 314 for the video content of a video call, the core network 304 can terminate the dedicated bearer 314 for the video content while maintaining a separate dedicated bearer 314 for the audio content 202.

The MME 308 or other element of the core network 304 can also determine from the downgrade reason indicator 502 in the NAS downgrade message that the downgrade of the enhanced call 102 was initiated either automatically by the UE 106 or by a user's instruction. The core network 304 can store that information in a database and/or use it to identify problems with the UE 106 or the telecommunication network's service.

Although FIG. 7 depicts an enhanced call 104 being set up and downgraded using SIP messages and FIG. 8 depicts an enhanced call 104 being set up and downgraded using NAS messages, in some examples an enhanced call 104 can be set up using one type of message and downgraded with another type of message. For example, a telecommunication network 108 can be configured to let a UE 106 initiate an enhanced call 104 through SIP messages sent to the IMS 306, but later downgrade the enhanced call 104 to an audio-only call 102 using NAS messages sent directly to the MME 308, or vice versa. In still other examples an enhanced call 104 can be set up using any other type of message, and/or a downgrade reason indicator 502 can be communicated from the UE 106 to the core network 104 and/or IMS 306 using any other type of message.

CONCLUSION

When a UE 106 includes a downgrade reason indicator 502 when it informs a telecommunication network 108 that it is downgrading an enhanced call 102 to an audio-only call 104, the telecommunication network 108 can track whether downgrades of enhanced calls 102 are occurring automatically or due to user choices. The telecommunication network 108 can also associate individual downgrades of enhanced calls 102 with other information it has about identities and/or locations of UEs 106 that initiated the downgrades, as well as identities and/or locations of base stations or other network equipment to which the UEs 106 were connected when the downgrades occurred. The telecommunication network 108 can use this information to diagnose problems with network service and/or individual UEs 106.

For example, in some situations a telecommunication network 108 can ignore downgrades of enhanced calls 102 that were initiated due to users' instructions, because such instructions may be the result of user choices and preferences and not indicate problems with UEs 106 or the telecommunication network 108. However, the telecommunication network 108 can correlate downgrades of enhanced calls 102 that were automatically initiated by UEs 106 against identities and locations of the downgrading UEs 106 and/or base stations 302 or other network equipment to which they were connected when the downgrades occurred. When such a correlation shows a high or unexpected number of automatic enhanced call 102 downgrades in a certain area, it can indicate that poor network service may be leading to automatic downgrades of enhanced calls 102. Personnel of the telecommunication network 108 can then investigate reasons for poor service in that area and/or take steps to improve network service in that area. Similarly, when one UE 106 reports a larger number or a higher percentage of automatic enhanced call 102 downgrades compared to other UEs 106, it can indicate that the UE 106 may be failing and may need to be replaced.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method of signaling a reason for a downgrade of an enhanced call to an audio-only call, comprising:
    engaging, by user equipment (UE) via a telecommunication network, in an enhanced call comprising audio content and additional content;
    generating, by the UE, a downgrade message that requests a downgrade of the enhanced call to an audio-only call comprising the audio content without the additional content;
    determining, by the UE, a reason for the downgrade of the enhanced call;
    adjusting, by the UE, a downgrade reason indicator included in the downgrade message to indicate the reason for the downgrade, the downgrade reason indicator identifying whether the UE is automatically downgrading the enhanced call or whether the UE is instead downgrading the enhanced call due to user instructions; and
    sending, by the UE to the telecommunication network, the downgrade message.

2. The method of claim 1, wherein the downgrade reason indicator is an encoded bit or flag in the downgrade message.

3. The method of claim 1, wherein the downgrade reason indicator is a code and/or text description in a header of the downgrade message.

4. The method of claim 1, wherein the downgrade message is a Session Initiation Protocol (SIP) message sent by the UE to an IP Multimedia Subsystem (IMS) of the telecommunication network.

5. The method of claim 1, wherein the downgrade message is a Non-Access Stratum (NAS) message sent by the UE to a Mobility Management Entity (MME) of the telecommunication network.

6. The method of claim 1, wherein the enhanced call is a video call and the additional content is video content.

7. The method of claim 1, wherein the enhanced call is a real-time text (RTT) call and the additional content is text content transmitted in real time as the text content is typed by a user.

8. The method of claim 1, wherein:
    engaging in the enhanced call comprises sending data packets for the audio content over a first dedicated bearer established for the UE in the telecommunication network, and sending data packets for the additional content over a second dedicated bearer established for the UE in the telecommunication network.

9. The method of claim 1, wherein the UE automatically downgrades the enhanced call upon an occurrence of one or more automatic downgrade conditions.

10. The method of claim 9, wherein the one or more automatic downgrade conditions include at least one of an available bandwidth level, a battery power level, a signal quality level, or a lost packet count failing to meet a threshold level.

11. A user equipment (UE), comprising:
one or more processors;
a radio interface;
a user interface; and
memory storing computer-executable instructions that, when executed by the one or more processors, cause the one or more processors to perform operations comprising:
engaging, by the radio interface via a telecommunication network, in an enhanced call comprising audio content and additional content;
generating a downgrade message that requests a downgrade of the enhanced call to an audio-only call comprising the audio content without the additional content;
determining a reason for the downgrade of the enhanced call;
adjusting a downgrade reason indicator included in the downgrade message to indicate the reason for the downgrade, the downgrade reason indicator identifying whether the downgrade is an automatic downgrade initiated due to an occurrence of one or more automatic downgrade conditions, or whether a user initiated the downgrade through instructions received via the user interface; and
sending, by the radio interface to the telecommunication network, the downgrade message.

12. The UE of claim 11, wherein the downgrade reason indicator is an encoded bit, flag, code, and/or text description in the downgrade message.

13. The UE of claim 11, wherein the downgrade message is a Session Initiation Protocol (SIP) message sent to an IP Multimedia Subsystem (IMS) of the telecommunication network.

14. The UE of claim 11, wherein the downgrade message is a Non-Access Stratum (NAS) message sent to a Mobility Management Entity (MME) of the telecommunication network.

15. The UE of claim 11, wherein the enhanced call is a video call and the additional content is video content.

16. The UE of claim 11, wherein the enhanced call is a real-time text (RTT) call and the additional content is text content transmitted in real time as the text content is typed by a user.

17. The UE of claim 11, wherein the downgrade message instructs the telecommunication network to terminate a dedicated bearer established in the telecommunication network used for sending data packets for the additional content.

18. One or more non-transitory computer-readable media storing computer-executable instructions that, when executed by one or more processors, cause the one or more processors to perform operations comprising:
engaging, by a user equipment (UE) and via a telecommunication network, in an enhanced call comprising audio content and additional content;
generating, by the UE, a downgrade message that requests a downgrade of the enhanced call to an audio-only call comprising the audio content without the additional content;
determining, by the UE, a reason for the downgrade of the enhanced call;
adjusting, by the UE, a downgrade reason indicator included in the downgrade message to indicate the reason for the downgrade, the downgrade reason indicator identifying whether the downgrade is an automatic downgrade initiated due to an occurrence of one or more automatic downgrade conditions, or whether a user initiated the downgrade through instructions; and
sending, by the UE, the downgrade message to the telecommunication network.

19. The computer-readable media of claim 18, wherein the downgrade reason indicator is an encoded bit, flag, code, and/or text description in the downgrade message.

20. The computer-readable media of claim 18, wherein:
engaging in the enhanced call comprises sending data packets for the audio content over a first dedicated bearer established in the telecommunication network, and sending data packets for the additional content over a second dedicated bearer established in the telecommunication network.

* * * * *